US006576287B2

(12) United States Patent
Miller et al.

(10) Patent No.: US 6,576,287 B2
(45) Date of Patent: Jun. 10, 2003

(54) EDIBLE FAT-BASED DISCRETE FLAVORING ADDITIVE WITH ANHYDROUS DEXTROSE AND OPTIONAL FRUCTOSE COMPONENT

(75) Inventors: Van Miller, Norval (CA); Vladimir Miller, Thornhill (CA); Edward Choy, Thornhill (CA)

(73) Assignee: Cargill Limited, Winnipeg (CA)

( * ) Notice: Subject to any disclaimer, the term of this patent is extended or adjusted under 35 U.S.C. 154(b) by 66 days.

(21) Appl. No.: 09/852,342

(22) Filed: May 11, 2001

(65) Prior Publication Data

US 2002/0187244 A1 Dec. 12, 2002

(51) Int. Cl.⁷ ............................. A23L 1/221; A23D 9/00
(52) U.S. Cl. ................... 426/650; 426/534; 426/601; 426/607; 426/613; 426/651; 426/658
(58) Field of Search ................................ 426/534, 580, 426/581, 585, 601, 603, 606, 607, 613, 650, 651, 658

(56) References Cited

U.S. PATENT DOCUMENTS

| 3,582,353 A | | 6/1971 | Fehr et al. | |
|---|---|---|---|---|
| 4,643,907 A | * | 2/1987 | Player et al. | ............... 426/580 |
| 5,354,572 A | * | 10/1994 | Miller et al. | ................. 426/580 |
| 5,431,945 A | * | 7/1995 | Miller et al. | ................. 426/580 |
| 5,447,735 A | | 9/1995 | Miller | |
| 6,312,751 B1 | * | 11/2001 | Cain et al. | .................... 426/549 |
| 6,312,752 B1 | * | 11/2001 | Lansbergen et al. | ........ 426/549 |
| 6,368,655 B1 | * | 4/2002 | Miller et al. | ................. 426/631 |
| 6,406,737 B1 | * | 6/2002 | Cain et al. | .................... 426/417 |

* cited by examiner

Primary Examiner—Leslie Wong
(74) Attorney, Agent, or Firm—Marks & Clerk

(57) ABSTRACT

An edible anhydrous fat-based discrete flavoring additive may be provided in the form of chips, flakes, or chunks. It contains less than 2% by weight of moisture; from 2% to 10% by weight of anhydrous dextrose; from 0% to 15% by weight of crystalline fructose; from 5% to 15% by weight of finely ground or liquid natural flavoring agent; from 25% to 35% by weight of an edible oil having a melting point between 20° C. and 40° C.; with the balance being finely ground sugar. The flavoring may be cinnamon or other natural ingredients such as maple, vanilla, almond oil, and botanical flavors. The presence of the anhydrous dextrose, which is hydrophilic, assures that the fat-based discrete flavoring additive is, itself, anhydrous; it also may contribute a slightly sweet aftertaste. The presence of crystalline fructose, when used, contributes a crunchiness to the anhydrous fat-based discrete flavoring additive.

20 Claims, No Drawings

EDIBLE FAT-BASED DISCRETE FLAVORING ADDITIVE WITH ANHYDROUS DEXTROSE AND OPTIONAL FRUCTOSE COMPONENT

FIELD OF THE INVENTION:

This invention relates to anhydrous fat-based flavoring additives which may be incorporated into baked goods, flour-based confections, frozen confections, and snack items. Specifically, the present invention is directed to edible anhydrous fat-based discrete flavoring additives which are presented in a form which may be chips, flakes, or chunks, which are flavored with cinnamon or other finely ground or liquid natural flavoring agent which is compatible with sugar—as to the sweetness of the product—and which are substantially solid at room temperatures. The anhydrous fat-based flavoring additive has a distinctive sweet cinnamon or other flavor, and may have an organoleptic sense of smoothness or crunchiness, depending on the specific formulation. In any event, the fat-based discrete flavoring additive of the present invention is anhydrous—that is, it is dry to the touch and feel—and it retains its form during a baking operation if necessary. In any formulation of discrete flavoring additives in keeping with the present invention, an important constituent is anhydrous dextrose; and another important constituent is an edible oil which has a melting point between 20 20° C. and 40° C.

The edible anhydrous fat-based discrete flavoring additives of the present invention are, therefore, sweet, dry, and with a flavoring such as cinnamon, maple, or other flavors discussed hereafter, which are compatible with sweetness. The flavoring is derived from natural flavoring agents which may be finely ground or liquid, as noted hereafter.

BACKGROUND OF THE INVENTION

The baking industry has attempted on many occasions to provide baked goods and flour confections that may have cinnamon or sweet cinnamon flavoring therein, or other flavoring as may be the case from time to time. Cinnamon is particularly widely used because it is compatible with sweetness; however, often the flavoring of cinnamon is incorporated into a flour mixture simply by introduction of cinnamon and sugar into the batter or dough, during its preparation. Sometimes, such as when sweet buns are prepared, the cinnamon may be mixed with butter and/or sugar and/or oils, then swirled into the dough just prior to its being placed in pans or on baking trays for baking. However, there has been a well-defined demand for discrete flavoring additives that might be in the form of chips, flakes, or chunks, and which might be used in flour-based confections, baked goods, and even frozen confections, much the same way as chocolate chips are used in cookies and ice cream confections. However, the present invention provides discrete flavoring additives that may be more widely used than such as chocolate chips—for example, in the preparation of muffins, bread, tea biscuits, snack items, and the like.

That is to say, there is a requirement to provide fat-based flavored additives which are discrete in their form and nature, and which are sweetened so as to be incorporated into baked goods, flour-based confections, frozen confections, and some snack items. Moreover, the requirement is for such discrete fat-based flavoring additives to use flavoring agents that are more subtle than chocolate—cinnamon, maple, vanilla, citrus oils, natural botanical flavoring agents such as fenugreek, almond oils, and the like, being particular examples of such additional flavoring ingredients that are compatible with sweetness but which are not normally to be found in an anhydrous fat-based discrete chip, flake, or chunk.

Still further, organoleptic quality may be such that the discrete flavoring additive, when encountered in the mouth during eating, should have excellent flavor release, sometimes with a sweet aftertaste, and a mouth sense which may either convey the quality of smoothness or, alternatively, the quality of crunchiness in some circumstances. The smoothness might be such as is found in highly conched milk chocolate, for example; and the crunchness might be such as that which is found in granulated sugar. However, such criteria are not generally capable of being incorporated into baked goods, flour confections, frozen confections, and the like. It is necessary to provide an appropriate carrier or vehicle; and the inventors herein have quite unexpectedly discovered that fat-based discrete flavoring additives having an anhydrous dextrose component will satisfy all of the requirements as they have been discussed above.

Specifically, in one embodiment of the present invention, the inventors have provided a fat-based carrier system which is anhydrous and which comprises a bakery-compatible oil that will exhibit substantially the same melting curve characteristic as that of butterfat or bakery shortening. That embodiment of the present invention provides chips, flakes, or chunks which are sufficiently solid at room temperature that they will not change their shape, they are such that natural flavoring ingredients may be incorporated thereinto, and thus they are capable of being used in baked and other flour-based confections.

In another embodiment of the present invention, similar criteria exist except that the chips, flakes, or chunks of discrete flavoring additive will have substantial solidity at about 5° C., and will have a noticeable snap characteristic. Such flavoring additives may be useful in snack items, and particularly in frozen confections such as ice cream.

It will, of course, be understood throughout this discussion that use of the words "chip", "flake", and "chunk", imply that the manufactured fat-based discrete flavoring additives in keeping with the present invention may have the form of a chip such as is commonly found in chocolate chips, butterscotch chips, and the like; or they may be in the form of a flake (that is, having a relatively small thickness when compared to its length and/or breadth); or in the form of a chunk (having a relatively large thickness when compared to its length and/or breadth). The precise manner of manufacture is beyond the scope of the present invention.

It follows that there are several criteria as to the fat which is used in the preparation of edible anhydrous fat-based discrete flavoring additives in keeping with the present invention. Specifically, the present invention calls for the use of an edible oil which will have a melting point somewhere between 20° C. and 40° C., and a melting curve characteristic measured on a nuclear magnetic resonance (N.M.R.) basis, such that it will have a 50% solid fat component and a 50% liquid fat component at a temperature which will be in the range of between 5° C. and 20° C. When the edible anhydrous fat-based discrete flavoring additives of the present invention are particularly intended for use with baked goods and flour-based confections, they will be manufactured using a bakery-compatible oil which will have a melting curve characteristic not dissimilar to that of butterfat or bakery shortening. On the other hand, particularly when the edible anhydrous fat-based discrete flavoring additives of the present invention are intended for use in use frozen confections such as ice cream, the edible oil which is used will be one having a depressed melting point. Of course, the fats that are used should, themselves, be substantially flavorless.

Of course, it is true that any oils or fats, and other ingredients that are used in the preparation of anhydrous fat-based discrete flavoring additives, in keeping with the present invention, must be compatible with requirements for controlled ingredient legends and other labelling provisions that are imposed upon food products.

The present invention provides flavoring additives whereby cinnamon or other natural flavoring ingredients that are compatible with sweetness may be carried into baked goods, flour-based confections, frozen confections, and snack items, while being suspended in an edible fat which has the form of a chip, flake, or chunk. In some circumstances, the edible oil which is used must be a bakery-compatible oil, when liquid, and it might be mixed with liquid butterfat. When the bakery compatible oil is used, however, it means that the fat ingredients of the present invention will exhibit solid, melting, and liquid characteristics which are similar to those of butterfat—whether or not butterfat is used. Certain dietary and/or religious requirements may preclude the actual use of butter in certain food items which may be consumed at different times; but, nonetheless, a sweetened sweet flavoring ingredient as provided by the present invention may be used without offending those requirements.

DESCRIPTION OF THE PRIOR ART

A prior flavoring additive is taught in FEHR etal. U.S. Pat. No. 3,582,353 issued Jun. 1, 1971. There, a flavored and/or colored shortening material of hard fat having a sharp melting point is used, and is distributed into a bakery mix. What results is distributed localized areas throughout the baked product, when it has been baked, that have a particular mouth sensation similar to that of butter. The flavoring materials may includes spices, simulated meat, fruit, fowl, or vegetable flavors, or other dairy flavors, as well as organic acids to provide sour flavors and the like. The resulting baked product is reported to have identifiable localized areas of the colored and/or flavored flakes in spots throughout the baked product, that have a discernible taste. However, Fehr et al. teach only localized areas of concentrated flavor, where the flavor is not necessarily a true or real flavor, and particularly which might specifically be of a gummy texture and/or caramelized flavor. Moreover, the Fehr et al. product is essentially fat, having very little solid constituent present, and it is not sweet.

MILLER U.S. Pat. No. 5,447,735 issued Sep. 5, 1995 teaches a sweet cinnamon or other flavored, fat-based anhydrous flake or chunk product for use with bakery products and flour-confections. There, the discrete flavoring additive product utilizes a bakery-compatible oil which is substantially liquid at about 35° C. to about 40° C., ground cinnamon or other flavoring in the amount of 5% to 15%, and granulated sugar. The product has a specific mouth sense of crunchiness due to the presence of the granulated sugar; the bakery-compatible oil or fat system holds the ground cinnamon or other flavoring in suspension, and is then mixed with the granulated sugar. Other flavorings may also be used.

SUMMARY OF THE INVENTION

In its broadest aspect, the present invention provides an edible anhydrous fat-based discrete flavoring additive in a form which may be chips, flakes, or chunks. The fat-based flavoring additive comprises less than 2% by weight of moisture; from 2% to 10% by weight of anhydrous dextrose; from 0% to 15% by weight of crystalline fructose; from 5% to 15% by weight of a finely ground or liquid natural flavoring agent; from 25% to 35% by weight of an edible oil having a melting point between 20° C. and 40° C.; with the balance being finely ground sugar.

The edible oil has a melting curve characteristic, measured on a nuclear magnetic resonance (N.M.R.) basis, such that it has 50% solid fat component and 50% liquid fat component at a temperature which may be within the range from 5° C. to 20° C. The edible oil is selected from the group which consists of vegetable oils, butterfats, and mixtures thereof, which edible oil exhibits the defined melting curve characteristic.

The edible oil is substantially solidified at temperatures in the range of 5° C. to 12° C. so as to be formed into chips, flakes, or chunks, and retains the formed chip, flake, or chunk format at temperatures below 20° C. to 35° C.

Another aspect of the present invention provides an edible anhydrous fat-based discrete flavoring additive for baked goods, flour-based confections, frozen confections, and snack items. The flavoring additive will have a form which may be chips, flakes, or chunks, and comprises less than 2% by weight of moisture; from 2% to 10% by weight of anhydrous dextrose; from 5% to 15% by weight of a finely ground or liquid natural flavoring agent; from 25% to 35% of a bakery-compatible oil that is substantially liquid at about 35° C. to 40° C.; with the balance being finely ground sugar.

The bakery-compatible oil exhibits a melting curve characteristic, measured on a nuclear magnetic resonance (N.M.R.) basis, with defined ranges of solid fat and liquid fat components at defined temperatures, as follows:

| | |
|---|---|
| 10.0° C. | 43%–66% solid fats, balance liquid fats |
| 21.1° C. | 32%–52% solid fats, balance liquid fats |
| 26.6° C. | 20%–44% solid fats, balance liquid fats |
| 33.3° C. | 6%–25% solid fats, balance liquid fats |
| 40.0° C. | 0%–5% solid fats, balance liquid fats |

The bakery-compatible oil is selected from the group which consists of vegetable oils, butterfats, and mixtures thereof, and exhibits the defined melting curve characteristic.

The anhydrous discrete fat-based flavoring additive substantially solidifies at temperatures within the range of 5° C. to 12° C. so as to be formed into chips, flakes, or chunks, and retains the formed chip, flake, or chunk format at temperatures below 30° C. to 35° C.

In yet a further embodiment of the present invention, a formulation for edible anhydrous fat-based discrete flavoring additives, such as that described immediately above, further comprises from 2% to 15% of crystalline fructose.

The fat-based flavoring additive of any embodiment of the present invention has a flavoring agent which is a finely ground or liquid natural flavoring agent, and which is chosen from the group consisting of cinnamon, ginger, nutmeg, allspice, maple sugar, dehydrated maple syrup, maple syrup, vanilla, vanilla extract, citrus oils, almond oil, natural botanical flavoring agents, and mixtures thereof.

In any embodiment of the present invention, the flavoring additive may be finely ground cinnamon.

Also, in any embodiment of the present invention, the finely ground sugar may consist of 0% to 10% by weight of finely ground granulated sugar, with the balance being chosen from the group consisting of icing sugar, confectioner's sugar, and mixtures thereof.

Still further, the fat-based flavoring additive, especially when it has a higher melting point within the range defined herein, will exhibit the characteristic that it is stable at room temperature of 19° C. to 23° C., and will not smear during mixing with other prescribed ingredients of baked goods and flour-based confections into which the fat-based flavoring additive may be incorporated prior to the baked goods and flour-based confections being baked.

Still further, the fat-based flavoring additive of the present invention, particularly when intended for incorporation into baked goods and flour-based confections, will exhibit the characteristic that it has a slow flow rate so as to stay substantially in place during a baking process at temperatures of 170° C. to 200° C. for periods of 5 minutes up to 90 minutes; and, moreover, so as to stay substantially in place during a bakery proofing process at temperatures of 40° C. to 60° C. for periods of 5 minutes up to several hours.

The fat-based flavoring additive of the present invention, in any embodiment thereof, may have the solid fat constituent of the vegetable oil being processed by blending, fractionation, or hydrogenation, but only to the extent necessary so as to obtain the defined melting curve characteristic.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

As noted, edible anhydrous fat-based discrete flavoring additives in keeping with the present invention are presented in the form of chips, flakes, or chunks. They are anhydrous, in that they have less than 2% by weight of moisture. Moreover, the moisture which may be in the chips, flakes, or chunks is unavailable as moisture because it is either bound with the bakery-compatible oil, or because it is bound with the anhydrous dextrose.

The presence of anhydrous dextrose in the formulation of edible anhydrous fat-based discrete flavoring additives in keeping with the present invention assures the anhydrous nature of the product, because anhydrous dextrose will function as a moisture getter—that is, it exhibits hydrophilic tendencies—when combined with other ingredients.

Moreover, the presence of anhydrous dextrose in discrete flavoring additives in keeping with the present invention assures that an organoleptic characteristic of the present invention is such that there will be somewhat of a sweet aftertaste left in the mouth after consumption of food products made with the flavoring additives of the present invention.

Depending on the characteristics of the fat that is used—that is, depending on whether the fat has a higher or lower melting point—the flavoring additives in keeping with the present invention may be utilized in baked goods such as cakes or breads, flour-based confections including cookies and the like, frozen confections such as ice cream, and snack items such as flavored snack bars—particularly of the sort that might be consumed by athletes or other persons engaged in physical activities who wish to consume a food item other than at mealtimes.

Thus, as noted, in its broadest sense the present invention may provide an edible anhydrous fat-based discrete flavoring additive which is such that the edible oil—which is one of the components of the formulation—will have a melting point between 20° C. and 40° C. The lower melting point edible oils are of the sort which will be used particularly in frozen confections and the like; the higher melting point edible oils are of the sort which will be used in flavoring additives that are intended for incorporation into baked goods and flour confections.

Thus, typically, the edible oil will have an N.M.R. melting curve characteristics which is such that it has 50% solid fat component and 50% liquid fat component at a temperature that is within the range of 5° C. to 20° C. At 5° C., with a melting point of about 20° C., such fat-based discrete flavoring additives are suitable for incorporation into ice cream confections and the like. Typically, as is well known in the ice cream industry, chips, flakes, or chunks may be incorporated into an ice cream mixture by being stirred therewith when the temperature of the ice cream mix has been brought up to about −5° C. to 0° C., or even slightly above, provided that a temperature excursion above 0° C. is very short-term. Obviously, the flavored additives must have integrity when they are added to the ice cream mix, so as not to smear during the mixing operation. Also, a somewhat lower melting point in the range of 20° C. to 25° C. assures organoleptic release of flavor in the mouth, notwithstanding that the interior surfaces of the mouth may have been cooled as a consequence of the consumption of ice cream.

Thus, and in any event, any edible anhydrous fat-based discrete flavoring additive according to the present invention, having a format which may be that of chips, flakes, or chunks, will at least comprise: less than 2% by weight of moisture; from 2% to 10% by weight of anhydrous dextrose; from 0% to 15% by weight of crystalline fructose; from 5% to 15% by weight of finely ground or liquid natural flavoring agent; from 25% to 35% of an edible oil having a melting point between 20° C. to 40° C.; with the balance being finely ground sugar.

It is noted above that edible anhydrous fat-based discrete flavoring additives in keeping with the present invention may comprise up to 15% by weight of crystalline fructose; on the other hand, they may not comprise crystalline fructose at all. If they do, then a certain crunchness is added to the organoleptic characteristic of the fat-based discrete flavoring additive, and that crunchiness may also be accompanied by an apparent release of sweetness which comes as a consequence of the incorporation of the crystalline fructose. Moreover, as noted previously, there may also be a sweet aftertaste, which comes as consequence of the incorporation of anhydrous dextrose into the formulation for the fat-based discrete flavoring additive.

As previously stated, the edible oil which is included in the formulation of fat-based discrete flavoring additives in keeping with the present invention may be bakery-compatible, exhibiting an N.M.R. melting curve characteristic as follows:

| | |
|---|---|
| 10.0° C. | 43%–66% solid fats, balance liquid fats |
| 21.1° C. | 32%–52% solid fats, balance iiquid fats |
| 26.6° C. | 20%–44% solid fats, balance liquid fats |
| 33.3° C. | 6%–25% solid fats, balance liquid fats |
| 40.0° C. | 0%–5% solid fats, balance liquid fats |

In that instance, the anhydrous fat-based discrete flavoring additives are particularly intended for incorporation into baked goods and flour-based confections, and are such that they solidify in the range of 5° C. to 12° C. so as to be formed into chips, flakes, or chunks. Moreover, the fat-based discrete flavoring additives in keeping with the present invention, when they have a bakery-compatible oil constituent, will maintain their formed chip, flake, or chunk format at temperatures below 30° C. to 35° C. This provides an organoleptic characteristic in that the presence and shape of the discrete flavoring additive may be sensed in the mouth, but the flavoring additive will melt in the mouth at mouth temperature.

Typically, the anhydrous fat-based discrete flavoring additives in keeping with the present invention have a smooth texture, which comes as a consequence of the incorporation thereinto of finely ground sugar. That finely ground sugar may comprise up to 10% by weight of finely ground granulated sugar, with the balance being icing sugar, confectioners sugar, and mixtures thereof.

However, as noted, the anhydrous fat-based discrete flavoring additives in keeping with the present invention may further comprise from 2% up to 15% of crystalline fructose, which provides a crunchiness to the organoleptic characteristic of the discrete flavoring additives. Otherwise, the anhydrous fat-based discrete flavoring additive of the present invention maintain their characteristic of keeping their format at temperatures below 30° C. to 35° C.—in other words, below mouth temperature.

Because the fat-based flavoring additives of the present invention may be incorporated into baked goods, having a bakery-compatible oil constituent thereof, the discrete fat-based flavoring additives will be stable at room temperature of 19° C. to 23° C., so as not to smear during mixing with the other prescribed ingredients of the baked goods or flour-based confections into which they will be incorporated prior to them being baked. Thus, they will retain their shape during the mixing operation.

Moreover, when the fat-based discrete flavoring additives of the present invention incorporate a bakery-compatible oil, they will also exhibit the characteristic that they have slow flow rates so as to stay substantially in place during a baking process which may occur at temperatures of 170° C. to 200° C., for periods of 5 minutes to 90 minutes. This is important when the discrete flavoring additives are being incorporated into such items as cakes and muffins, certain kinds of cookies, tea biscuits, and the like.

Still further, when the discrete fat-based flavoring additives of the present invention are to be incorporated into breads and rolls, and the like, which may also require that they be proofed, the slow flow rate characteristic of the fat-based flavoring additives will be such that they stay substantially in place during the bakery proofing process at temperatures of 40° C. to 60° C., for periods of 5 minutes up to several hours.

In order that the vegetable oils which may be used in preparation of the anhydrous fat-based discrete flavoring additives of the present invention will exhibit the defined melting curve characteristic noted above, it may be necessary for the vegetable oils to be processed by being blended, fractionated, or hydrogenated, but only to the extent which is necessary so as to obtain the defined melting curve characteristic.

Turning briefly to the issue of the flavoring agent which is incorporated in any discrete fat-based flavoring additive in keeping with the present invention, the flavoring agent is finely ground or liquid, and is a natural flavoring agent. Typically, because the market demand is the greatest in this regard, the flavoring agent is cinnamon.

However, other flavoring agents may also be used in any discrete fat-based flavoring additives in keeping with the present invention including, for example, ginger, nutmeg, allspice, maple sugar, dehydrated maple syrup, maple syrup, vanilla, vanilla extract, citrus oils, almond oil, natural botanical flavoring agents, and mixtures thereof. The citrus oils may be derived from oranges lemons, limes, and the like, and may be employed particularly for incorporation into baked goods such as muffins, or frozen confections such as ice cream.

Natural botanical flavoring agents may be particularly such as fenugreek, which is known to have certain medicinal properties and is typically used by herbal medicine practitioners and the like for the treatment of atherosclerosis, constipation, diabetes, high cholesterol, or high triglycerides. Other natural botanical flavoring agents may be such as rosehip, dried and ground chrysanthemum leaves, green tea powder, and the like.

There has been described an edible anhydrous fat-based discrete flavoring additive which may be incorporated into a number of different kinds of food items including baked goods, flour-based confections, frozen confections, and snack items. A principal constituent of the edible anhydrous fat-based discrete flavoring additives is the presence of from 2% up to 10% by weight of anhydrous dextrose, as well as the presence of from 5% to 15% by weight of a finely ground or liquid natural flavoring agent, from 25% to 35% by weight of an edible oil having a defined melting curve characteristic as noted above, with the balance being finely ground sugar. As noted, crystalline fructose may be a further and additional component of the formulation of edible anhydrous fat-based discrete flavoring additives in keeping with the present invention.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially solidifed is intended to mean having the appearance of being solid, with a defined shape, and no noticeable tendency to change that shape at the temperatures which are referred to in the above discussion.

Other modifications may be used in the formulation and production of the discrete fat-based flavoring additives of the present invention, without departing from the spirit and scope of the accompanying claims.

What is claimed is:

1. An edible anhydrous fat-based discrete flavoring additive in a form chosen from the group consisting of chips, flakes, and chunks, said fat-based flavoring additive comprising:

less than 2% by weight of moisture;
from 2% to 10% by weight of anhydrous dextrose;
from 0% to 15% by weight of crystalline fructose;
from 5% to 15% by weight of finely ground or liquid natural flavoring agent;
from 25% to 35% of an edible oil having a melting point between 20° C. to 40° C.;
with the balance being finely ground sugar;
wherein said edible oil has a melting curve characteristic, measured on a nuclear magnetic resonance (N.M.R.)

basis, such that it has 50% solid fat component and 50% liquid fat component at a temperature that is within the range of 5° C. to 20° C.;

wherein said edible oil is selected from the group consisting of vegetable oils, butter fats, and mixtures thereof, which exhibit said defined melting curve characteristic; and wherein said edible oil is substantially solidified at temperatures in the range of 5° C. to 12° C. so as to be formed into chips, flakes, or chunks, and retains the formed chip, flake, or chunk format at temperatures below 20° C. to 35° C.

2. The fat-based flavoring additive of claim 1, wherein said finely ground or liquid natural flavoring agent is chosen from the group consisting of cinnamon, ginger, nutmeg, allspice, maple sugar, dehydrated maple syrup, maple syrup, vanilla, vanilla extract, citrus oils, almond oil, natural botanical flavoring agents, and mixtures thereof.

3. The fat-based flavoring additive of claim 1, wherein said finely ground natural flavoring agent is cinnamon.

4. The fat-based flavoring additive of claim 1, wherein when necessary, said solid fat constituents of said vegetable oils are processed by being blended, fractionated, or hydrogenated, only to the extent necessary so as to obtain said defined melting curve characteristics.

5. An edible anhydrous fat-based discrete flavoring additive for baked goods, and for flour-based confections, frozen confections, and snack items, where said flavoring additive has a form chosen from the group consisting of chips, flakes, and chunks; said fat-based flavoring additive comprising:

less that 2% by weight of moisture;

from 2% to 10% by weight of anhydrous dextrose;

from 5% to 15% by weight of a finely ground or liquid natural flavoring agent;

from 25% to 35% of a bakery-compatible oil that is substantially liquid at about 35° C. to 40° C.;

with the balance being finely ground sugar;

wherein said bakery-compatible oil exhibits a melting curve characteristic, measured on a nuclear magnetic resonance (N.M.R.) basis, with defined ranges of solid fat and liquid fat components at defined temperatures, as follows:

| | |
|---|---|
| 10.0° C. | 43%–66% solid fats, balance liquid fats |
| 21.1° C. | 32%–52% solid fats, balance liquid fats |
| 26.6° C. | 20%–44% solid fats, balance liquid fats |
| 33.3° C. | 6%–25% solid fats, balance liquid fats |
| 40.0° C. | 0%–5% solid fats, balance liquid fats | wherein said bakery compatible oil is selected from the group consisting of vegetable oils, butter fats, and mixtures thereof, which exhibit said defined melting curve characteristic; and wherein said anhydrous discrete fat-based flavoring additive substantially solidifies at temperatures within the range of 5° C. to 12° C. so as to be formed into chips, flakes, or chunks, and retains the formed chip, flake, or chunk formed at temperatures below 30° C. to 35° C.

6. The fat-based flavoring additive of claim 5, wherein said finely ground or liquid natural flavoring agent is chosen from the group consisting of cinnamon, ginger, nutmeg, allspice, maple sugar, dehydrated maple syrup, maple syrup, vanilla, vanilla extract, citrus oils, almond oil, natural botanical flavoring agents, and mixtures thereof.

7. The fat-based flavoring additive of claim 5, wherein said finely ground natural flavoring agent is cinnamon.

8. The fat-based flavoring additive of claim 5, wherein said finely ground sugar consists of 0% to 10% by weight of finely ground granulated sugar, with the balance being chosen from the group consisting of icing sugar, confectioners sugar, and mixtures thereof.

9. The fat-based flavoring additive of claim 5, wherein said bakery-compatible oil exhibits the characteristic that it is stable at room temperature of 19° C. to 23° C., so as not to smear during mixing with other prescribed ingredients of baked goods and flour-based confections into which said fat-based flavoring additive may be incorporated prior to said baked goods and flour-based confections being baked.

10. The fat-based flavoring additive of claim 5, wherein said bakery-compatible oil exhibits the characteristic that it has slow flow rates so as to stay substantially in place during a baking process at temperatures of 170° C. to 200° C. for period of 5 minutes up to 90 minutes.

11. The fat-based flavoring additive of claim 5, wherein said bakery-compatible oil exhibits the characteristic that it has slow flow rates so as to stay substantially in place during a bakery proofing process at temperature of 40° C. to 60° C. for periods of 5 minutes up to several hours.

12. The fat-based flavoring additive of claim 5, wherein when necessary, said solid fat constituents of said vegetable oils are processed by being blended, fractionated, or hydrogenated, only to the extent necessary so as to obtain said defined melting curve characteristics.

13. An edible anhydrous fat-based discrete flavoring additive for baked goods, and for flour-based confections, frozen confections, and snack items, where said flavoring additive has a form chosen from the group consisting of chips, flakes, and chunks; said fat-based flavoring additive comprising:

less that 2% by weight of moisture;

from 2% to 10% by weight of anhydrous dextrose;

from 5% to 15% by weight of a finely ground or liquid natural flavoring agent;

from 25% to 35% of a bakery-compatible oil that is substantially liquid at about 35° C. to 40° C.;

from 2% to 15% of crystalline fructose;

with the balance being finely ground sugar;

wherein said bakery-compatible oil exhibits a melting curve characteristic, measured on a nuclear magnetic resonance (N.M.R.) basis, with defined ranges of solid fat and liquid fat components at defined temperatures, as follows:

| | |
|---|---|
| 10.0° C. | 43%–66% solid fats, balance liquid fats |
| 21.1° C. | 32%–52% solid fats, balance liquid fats |
| 26.6° C. | 20%–44% solid fats, balance liquid fats |
| 33.3° C. | 6%–25% solid fats, balance liquid fats |
| 40.0° C. | 0%–5% solid fats, balance liquid fats | wherein said bakery compatible oil is selected from the group consisting of vegetable oils, butter fats, and mixtures thereof, which exhibit said defined melting curve characteristic; and wherein said anhydrous discrete fat-based flavoring additive substantially solidifies at temperatures within the range of 5° C. to 12° C. so as to be formed into chips, flakes, or chunks, and retains the formed chip, flake, or chunk formed at temperatures below 30° C. to 35° C.

14. The fat-based flavoring additive of claim 13, wherein said finely ground or liquid natural flavoring agent is chosen from the group consisting of cinnamon, ginger, nutmeg, allspice, maple sugar, dehydrated maple syrup, maple syrup, vanilla, vanilla extract, citrus oils, almond oil, natural botanical flavoring agents, and mixtures thereof.

15. The fat-based flavoring additive of claim 13, wherein said finely ground natural flavoring agent is cinnamon.

16. The fat-based flavoring additive of claim 13, wherein said finely ground sugar consists of 0% to 10% by weight of finely ground granulated sugar, with the balance being chosen from the group consisting of icing sugar, confectioners sugar, and mixtures thereof.

17. The fat-based flavoring additive of claim 13, wherein said bakery-compatible oil exhibits the characteristic that it is stable at room temperature of 19° C. to 23° C., so as not to smear during mixing with other prescribed ingredients of baked goods and flour-based confections into which said fat-based flavoring additive is incorporated prior to said baked goods and flour-based confections being baked.

18. The fat-based flavoring additive of claim 13, wherein said bakery-compatible oil exhibits the characteristic that it has slow flow rates so as to stay substantially in place during a baking process at temperatures of 170° C. to 200° C. for period of 5 minutes up to 90 minutes.

19. The fat-based flavoring additive of claim 13, wherein said bakery-compatible oil exhibits the characteristic that it has slow flow rates so as to stay substantially in place during a bakery proofing process at temperature of 40° C. to 60° C. for periods of 5 minutes up to several hours.

20. The fat-based flavoring additive of claim 13, wherein when necessary, said solid fat constituents of said vegetable oils are processed by being blended, fractionated, or hydrogenated, only to the extent necessary so as to obtain said defined melting curve characteristics.

* * * * *